US006829401B2

(12) United States Patent
Duelk et al.

(10) Patent No.: US 6,829,401 B2
(45) Date of Patent: Dec. 7, 2004

(54) PARALLELIZATION OF OPTICAL SWITCH FABRICS

(75) Inventors: Marcus Duelk, Atlantic Highlands, NJ (US); Jurgen Gripp, Cranford, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 112 days.

(21) Appl. No.: 10/135,216

(22) Filed: Apr. 30, 2002

(65) Prior Publication Data

US 2003/0202733 A1 Oct. 30, 2003

(51) Int. Cl.[7] .............................. G02B 6/28; H04J 14/02
(52) U.S. Cl. ........................... 385/16; 385/17; 359/124
(58) Field of Search ............................. 385/15, 16, 17, 385/24, 37; 398/82, 84; 359/128, 127, 124

(56) References Cited

U.S. PATENT DOCUMENTS

| 5,241,409 A | * | 8/1993 | Hill et al. ................... 398/56 |
| 5,303,078 A | * | 4/1994 | Brackett et al. ............. 398/51 |
| 5,450,224 A | * | 9/1995 | Johansson .................. 398/50 |
| 5,627,925 A | * | 5/1997 | Alferness et al. ............ 385/17 |
| 5,633,741 A | * | 5/1997 | Giles ........................... 398/79 |
| 5,745,613 A | * | 4/1998 | Fukuchi et al. .............. 385/24 |
| 5,754,320 A | * | 5/1998 | Watanabe et al. ............ 398/50 |
| 5,870,216 A | * | 2/1999 | Brock et al. ................. 398/49 |
| 5,937,117 A | * | 8/1999 | Ishida et al. ................. 385/24 |
| 6,317,529 B1 | * | 11/2001 | Kashima ...................... 385/16 |
| 6,388,782 B1 | * | 5/2002 | Stephens et al. ............. 398/79 |
| 6,449,073 B1 | * | 9/2002 | Huber .......................... 398/82 |
| 6,459,518 B1 | * | 10/2002 | Suzuki et al. ............... 398/152 |
| 6,501,866 B2 | * | 12/2002 | Thomas ......................... 385/1 |
| 6,510,261 B2 | * | 1/2003 | Sorin et al. .................. 385/27 |
| 6,542,655 B1 | * | 4/2003 | Dragone ....................... 385/17 |
| 6,710,911 B2 | * | 3/2004 | LoCascio et al. ........... 359/326 |

* cited by examiner

Primary Examiner—Nimeshkumar D. Patel
Assistant Examiner—Dalei Dong

(57) ABSTRACT

A switch employs two or more parallel optical switch fabrics, e.g., arrayed waveguide gratings (AWG), combined with a set of transmitter cards. Each transmitter card has a tunable laser and two or more modulators, each configured to modulate a different copy of the output of the laser with a different set of data. Outputs of the modulators in each transmitter card are coupled to a set of corresponding input ports in the AWGs. A set of receiver cards, each receiver card having the number of receivers matching that of modulators in the transmitter cards, is coupled to output ports of the AWGs, such that each receiver card receives signals from a set of corresponding output ports in the AWGs. Each transmitter card can be configured to send data to any receiver card by setting the wavelength of its laser to the value corresponding to the set of output ports in the AWGs coupled to that receiver card. A parallelized optical switch may be optimized based on a desired set of criteria, e.g., capacity, cost, and/or size.

26 Claims, 4 Drawing Sheets

US 6,829,401 B2

PARALLELIZATION OF OPTICAL SWITCH FABRICS

BACKGROUND OF THE INVENTION

1. Field of the Invention

The present invention relates to optical communication equipment.

2. Description of the Related Art

FIG. 1 shows a representative switch 100 of the prior art for routing data in a modern communication system. Switch 100 is a 3×3 switch that can route data from any one of its three inputs to any one of its three outputs. Switch 100 comprises a 3×3 arrayed waveguide grating (AWG) 104, three transmitter cards 106 coupled to input ports of AWG 104, and three receivers 130 coupled to output ports of AWG 104. Each transmitter card 106 is configured to receive a corresponding electrical stream of data, convert it into an optical signal, and send that optical signal to AWG 104. AWG 104 is a solid state device configured to redirect light entering any one of the input ports to a selected output port based on its wavelength. Each receiver 130 is configured to receive an optical signal from one of the output ports of AWG 104 and convert it back into a corresponding electrical data stream.

Each transmitter card 106 comprises a tunable laser 110 and a modulator 120. Laser 110 feeds an optical carrier signal into modulator 120. Modulator 120 modulates the carrier signal with data based on the corresponding electrical input data stream to produce an optical data-modulated output signal of the respective transmitter card 106. Each transmitter card 106 can be configured to send data to any chosen receiver 130 by setting the wavelength of laser 110 to the value for the corresponding output port of AWG 104. Depending on the implementation of AWG 104, lasers 110 corresponding to different input ports of AWG 104 may be tunable over different wavelength ranges.

The capacity of a switch, such as switch 100, defined as the number of ports multiplied by the throughput of each port is measured, e.g., in Gigabits per second (Gb/s). To meet the demands of ever-increasing data traffic in communication networks, switches of relatively large capacity are desirable. However, direct scaling of the switch architecture illustrated in FIG. 1 may not increase the switch capacity in proportion to the increasing switch size because the switch capacity is a convoluted function of many different parameters. For example, any one or a combination of the following may limit the capacity of switch 100: (i) the tuning range of lasers 110; (ii) the physical dimensions of the wafer on which AWG 104 is implemented and therefore the number of AWG channels; and/or (iii) the tolerable level of inter-channel crosstalk.

SUMMARY OF THE INVENTION

According to certain embodiments, the present invention provides a parallelized switch of increased capacity. The switch employs two or more parallel optical switch fabrics, e.g., arrayed waveguide gratings (AWG), combined with a set of transmitter cards. Each transmitter card has a tunable laser and two or more modulators, each configured to modulate a different copy of the output of the laser with a different set of data. Outputs of the modulators in each transmitter card are coupled to a set of corresponding input ports in the AWGs. A set of receiver cards, each receiver card having a number of receivers matching that of modulators in the transmitter cards, is coupled to output ports of the AWGs, such that each receiver card receives signals from a set of corresponding output ports in the AWGs. Each transmitter card can be configured to send data to any receiver card by setting the wavelength of its laser to the value corresponding to the set of output ports in the AWGs coupled to that receiver card. A parallelized switch of the present invention may be optimized based on a desired set of criteria, e.g., capacity, cost, and/or size.

According to one embodiment, the present invention is an apparatus, comprising: (A) J optical switch fabrics (OSF), each OSF having N input ports and N output ports and configured to route optical signals from the input ports to the output ports based on wavelength, where J and N are integers greater than one; (B) N transmitter cards, each transmitter card comprising a tunable laser and J modulators, each modulator configured to modulate a signal generated by said tunable laser with data, wherein the J modulators are coupled to J corresponding input ports of the J OSFs; and (C) N receiver cards, each receiver card comprising J receivers coupled to J corresponding output ports of the J OSFs, wherein the apparatus is configured to route data from any transmitter card to any receiver card.

According to another embodiment, the present invention is a method of transmitting data, comprising the steps of: (i) modulating an optical signal generated by a tunable laser with data using J modulators to produce J data-modulated optical signals, where J is an integer greater than one; and (ii) routing the J data-modulated optical signals using J optical switch fabrics (OSF), wherein: each OSF has N input ports and N output ports and is configured to route optical signals from the input ports to the output ports based on wavelength, where N is an integer greater than one; and the J modulators are coupled to J corresponding input ports of the J OSFs.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Although the invention is described for optical switches employing AWGs, those skilled in the art can appreciate that the invention can also be applied to optical switches employing other types of optical switch fabrics.

Figure 1:
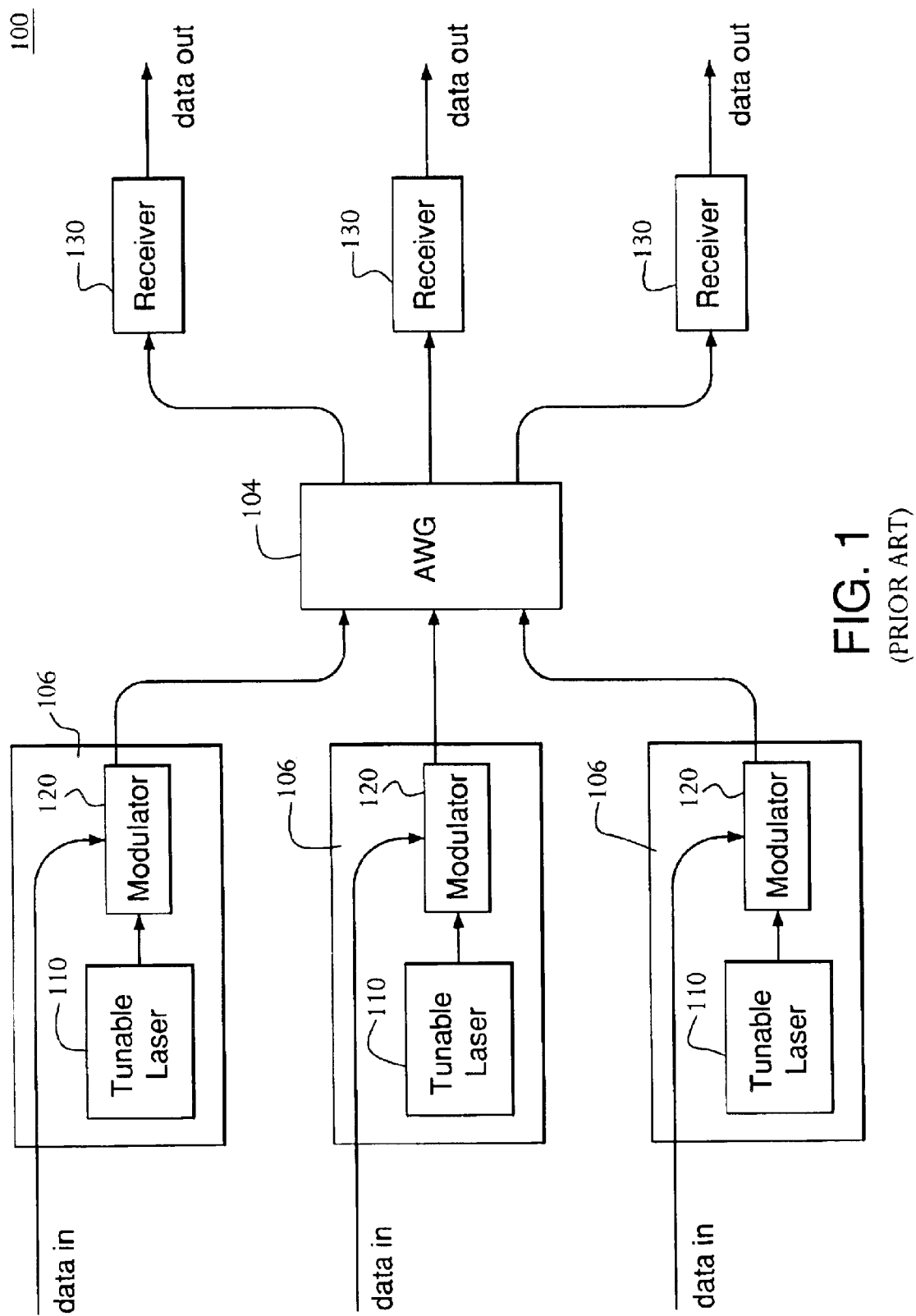
FIG. 1 shows a prior art switch for routing data.

Before embodiments of the present invention are described in detail, different factors limiting the capacity of a switch, such as switch 100 of FIG. 1, are briefly characterized.

The tuning range of the lasers, e.g., lasers 110 of switch 100, imposes one limitation on switch capacity. For example, a typical tuning range, $\Delta\Lambda$, may be about 32 nm (e.g., from 1528 to 1560 nm). If $\Delta\lambda$ is the spacing between different channels in switch 100, then the maximum number of channels per laser is given by Equation (1) as follows:

$$N_{laser} = \frac{\Delta\Lambda}{\Delta\lambda} \quad (1)$$

The value of $\Delta\lambda$ that can be implemented in an AWG (e.g., AWG 104) is in turn limited by the bit rate (r) of transmitted data, data distortion due to the spectral shape of the AWG channel passband, and the acceptable level of crosstalk between different channels. This particular set of limitations is often characterized by the spectral efficiency ($\eta$) defined by Equation (2) as follows:

$$\eta = \frac{r}{\Delta v} \quad (2)$$

where $\Delta v$ is the frequency range corresponding to $\Delta\lambda$. If r is expressed in frequency units (e.g., GHz), then $\eta$ is a dimensionless quantity. For example, one representative value of $\eta$ that may be used in a switch is 0.4. Depending on the particular switch implementation, different values of $\eta$ may be used. The mentioned spectral efficiency of 0.4 may correspond to, e.g., r=40 GHz (Gb/s) and $\Delta v$=100 GHz (corresponding to $\Delta\lambda$ of about 0.8 nm). In general, increasing the bit rate increases the spacing between the laser center band and modulation-induced side bands. As such, at higher bit rates, larger channel spacing ($\Delta\lambda$) is needed to keep the amount of data distortion approximately the same. As a result, the spectral efficiency is in first order bit-rate independent.

Maximum dimensions of an AWG (e.g., AWG 104 of switch 100) impose a limitation on the maximum number of ports ($N_{AWG}$) in the switch, and therefore on the switch capacity. For example, a relatively large number of ports usually corresponds to a relatively wide and/or long AWG. In general, the longitudinal dimensions of an AWG are limited by the technology (e.g., wafer size) used in the production of that AWG. For example, one wafer size employed in the industry is 6 inches (in diameter). For channel spacing between 0.05 nm and 0.8 nm, such wafer size would enable realization of an AWG having a maximum of about 120 input/output ports.

Table 1 illustrates the influence of different parameters on the maximum capacity of optical switches having architectures similar to that of switch 100. Four representative cases are analyzed. Line 1 of Table 1 shows four different bit rates corresponding to the four cases. For ease of comparison, the same spectral efficiency ($\eta$=0.4, line 2) and tuning range ($\Delta\Lambda$=32 nm, line 3) are assumed in each case. As already explained above in relation to Equation (2), for a given spectral efficiency, channel spacing ($\Delta\lambda$, line 4) is directly proportional to the bit rate (r, line 1). The maximum number of channels per laser ($N_{laser}$, line 5) is calculated using Equation (1) and the maximum number of ports ($N_{AWG}$, line 6) is estimated assuming a maximum wafer size of about 6 inches. The maximum number of AWG ports (line 6) may also be a weak function of channel spacing due to the design subtleties that are beyond the scope of this disclosure.

TABLE 1

Representative Cases Illustrating the Influence of Different Parameters on the Maximum Capacity of an Optical Switch

|   |   | Case 1 | Case 2 | Case 3 | Case 4 |
|---|---|---|---|---|---|
| 1 | Bit Rate, r (Gb/s) | 2.5 | 10 | 20 | 40 |
| 2 | Spectral Efficiency, $\eta$ | 0.4 | 0.4 | 0.4 | 0.4 |
| 3 | Tuning Range, $\Delta\Lambda$ (nm) | 32 | 32 | 32 | 32 |
| 4 | Channel Spacing, $\Delta\lambda$ (nm) | 0.05 | 0.2 | 0.4 | 0.8 |
| 5 | Maximum Number of Channels per Laser, $N_{laser}$ | 640 | 160 | 80 | 40 |
| 6 | Maximum Number of Ports, $N_{AWG}$ | 120 | 120 | 128 | 100 |
| 7 | Maximum Number of Channels per Switch | 120 | 120 | 80 | 40 |
| 8 | Switch Capacity (Gb/s) | 300 | 1200 | 1600 | 1600 |

The capacity of a switch is determined by multiplying the maximum number of channels in the switch by the channel bit rate of each channel (line 1). The maximum number of channels in a switch (line 7) is the smaller of the maximum number of channels per laser (line 5) and the maximum number of ports in the AWG (line 6). In the examples shown in Table 1, the switch capacities for Cases 1 and 2 are limited by the maximum number of AWG ports (line 6), while the switch capacities for Cases 3 and 4 are limited by the maximum number of channels per laser (line 5). The resulting switch capacities are shown in line 8.

As indicated by the results in line 8, for a given spectral efficiency (line 2) and laser tuning range (line 3), there is a limit to how much switch capacity can be increased by increasing the bit rate. For example, going from Case 1 to Case 2, quadrupling the bit rate results in a quadrupling of the switch capacity. However, going from Case 2 to Case 3, doubling the bit rate increases the switch capacity by only a third, while doubling the bit rate again from Case 3 to Case 4 results in no increase in the switch capacity. This limit to the size of the switch capacity results from the fact that higher bit rates (line 1) imply larger channel spacing (line 4), which results in fewer channels per laser (line 5).

Since Cases 3 and 4 provide the same switch capacity (i.e., 1600 Gb/s), the decision as to which design to select for a particular application may depend on additional factors, such as cost, space, and power consumption. Moreover, since the maximum number of channels per laser (line 5) determines the maximum number of channels in the switch for both Cases 3 and 4, the switch for Case 3 can be implemented using 80 ports per AWG, while the switch for Case 4 can be implemented using only 40 ports per AWG. Having fewer AWG ports generally reduces the overall amount of hardware and thus alleviates space and power constraints. Therefore, the design of Case 4 might be more attractive than the design of Case 3 for some applications.

Figure 2:
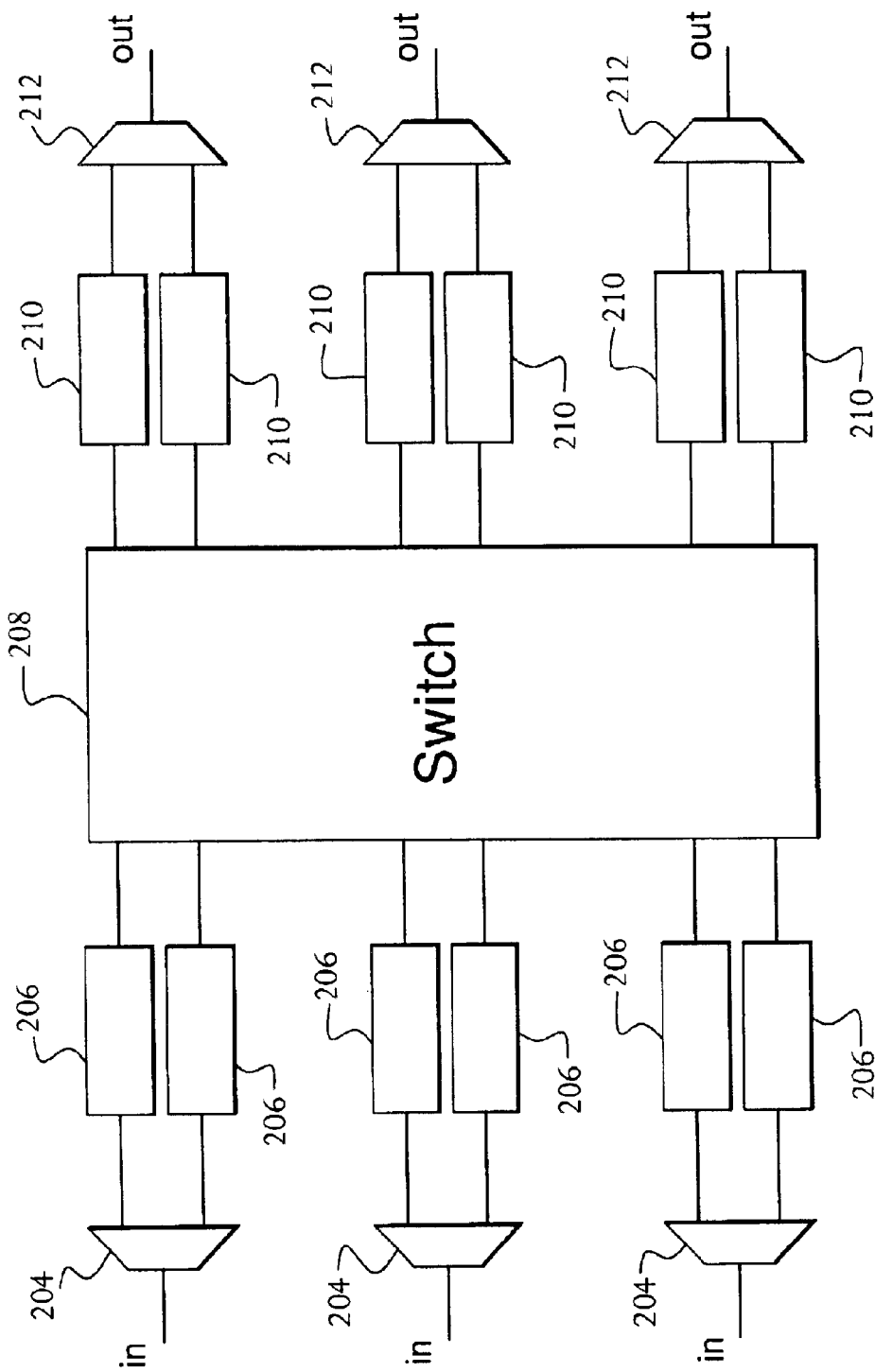
FIG. 2 shows a system for routing data according to one embodiment of the present invention.

FIG. 2 shows a system 200 for routing data from its three inputs to its three outputs according to one embodiment of the present invention. System 200 comprises demultiplexers (DMUXs) 204, optional input buffers 206, a switch 208, optional output buffers 210, and multiplexers (MUXs) 212. Each DMUX 204 receives a respective input electrical data signal (input trunk signal) at a relatively high bit rate (e.g., 40 Gb/s) and converts it into two relatively low bit-rate (e.g., 20 Gb/s) electrical data signals (branch signals). Data from each branch signal may be optionally processed, e.g., assembled into packets and/or buffered, using the corresponding input buffer 206 prior to being routed through switch 208. Switch 208 routes data from each set of corresponding branch signals into a set of corresponding tributary signals. After being routed through switch 208, the data may be optionally processed by the corresponding output buffer 210 to generate a relatively low bit-rate electrical data signal (tributary signal). Each set of tributary signals corresponding to a set of branch signals is combined into a relatively high bit-rate output electrical data signal (output trunk signal) by the corresponding MUX 212. In one embodiment, an optical-to-electrical (O/E) converter may be used to generate each input trunk signal from an optical input signal received via an optical fiber input link. In addition, an electrical-to-optical (E/O) converter may be used to convert the output trunk signal into an optical output signals for transmission over an optical fiber output link.

Figure 3:
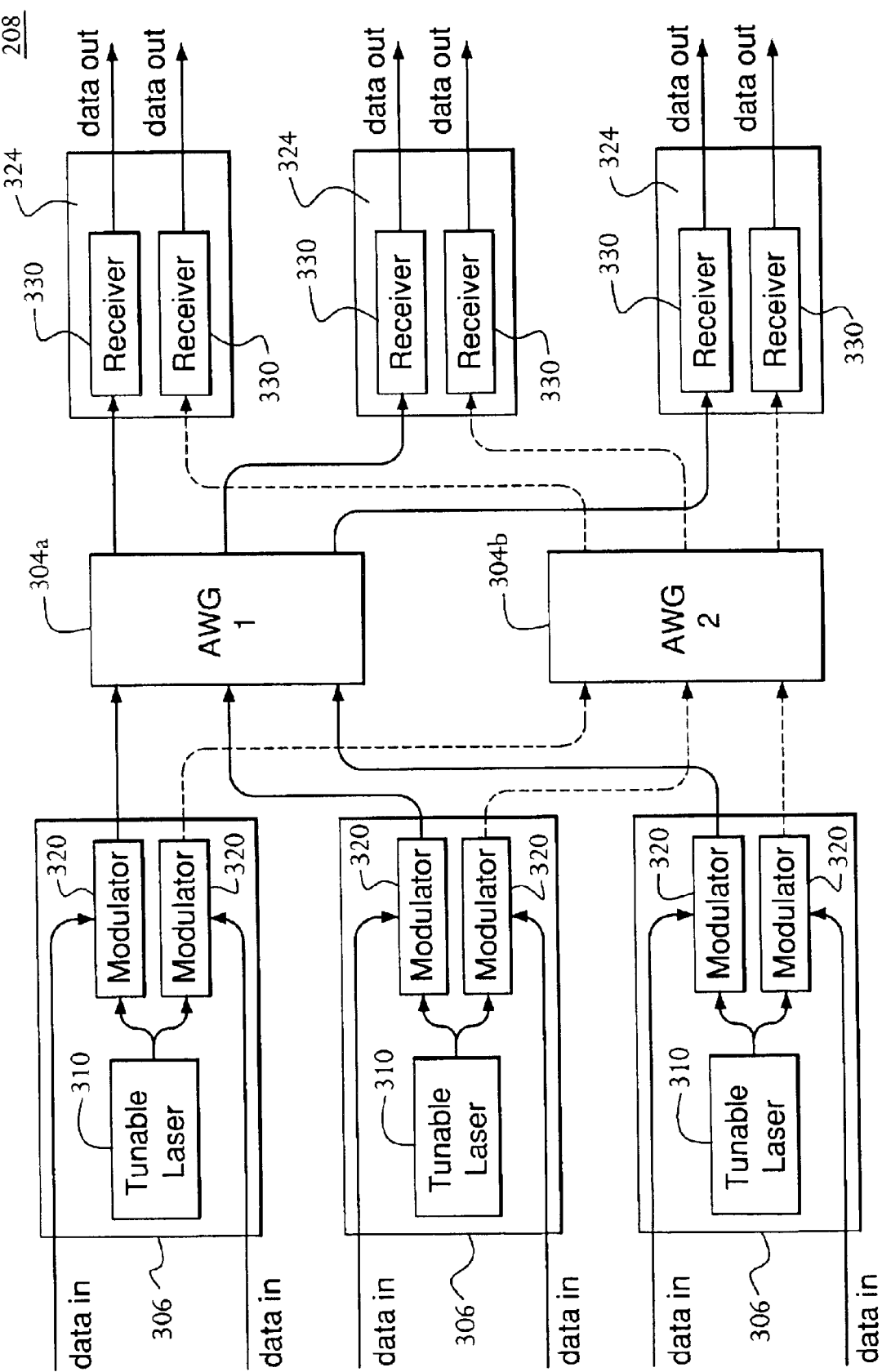
FIG. 3 shows a switch that may be used in the system of FIG. 2 according to one embodiment of the present invention.

FIG. 3 shows switch 208 of system 200 according to one embodiment of the present invention. Switch 208 comprises two 3×3 AWGs 304a–b, three transmitter cards 306, and three receiver cards 324. Each transmitter card 306 comprises a tunable laser 310 and two modulators 320. Lasers 310 of switch 208 may be similar to lasers 110 of switch 100. The carrier signal generated by each laser 310 is split into two signal copies that are fed into respective modulators 320. Each modulator 320 of each transmitter card 306 modulates the carrier signal in each line with data (e.g., received from DMUX 204 via optional input buffer 206) to produce one of two data-modulated output signals of the corresponding transmitter card 306. A first data-modulated signal of each transmitter card 306 is coupled to an input port of AWG 304a and a second data-modulated signal of the same transmitter card 306 is coupled to the input port of AWG 304b corresponding to that used for the first data-modulated signal in AWG 304a. Each receiver card 324 comprises two receivers 330. Each transmitter card 306 can be configured to send data to any chosen receiver card 324 by setting the wavelength of its laser 310 to the value corresponding to the output ports of AWGs 304a and 304b coupled to that receiver card.

In different embodiments, the basic parallel architecture of switch 208 shown in FIG. 3 can be scaled up to any arbitrary number of connections between transmitter cards and receiver cards. For example, a switch (analogous to switch 208 of FIG. 3) having N transmitter/receiver cards, each transmitter card having J modulators (e.g., modulators 320) and each receiver card having J receivers (e.g., receivers 330), may be configured with J N×N AWGs. Corresponding input ports in each N×N AWG are coupled to the same transmitter card and corresponding output ports in each N×N AWG are coupled to the same receiver card. In such a system, any one of the N transmitter cards can be configured to send data to any one of the N receiver cards, thus implementing an N×N switching function. In such embodiments, in a manner analogous to DMUXs 204 and MUXs 212 of FIG. 2, each DMUX would generate J branch signals from each input trunk signal, and each MUX would combine J tributary signals to form each output trunk signal.

Table 2 illustrates the influence of different parameters on the maximum capacity of parallelized switches of the present invention. Three representative cases (Cases 5–7) of parallelized switches are analyzed and compared to the prior art switch of Case 4 in Table 1. Line 1 of Table 2 shows the number of (parallelized) AWGs in a switch. Line 2 shows the bit rate employed by the system in each case. For ease of comparison, the same throughput per transmitter card (40 Gb/s, line 3), spectral efficiency ($\eta=0.4$, line 4), and tuning range ($\Delta\Lambda=32$ nm, line 5) are assumed in each case. Lines 6–10 in Table 2 are analogous to lines 4–8, respectively, in Table 1.

TABLE 2

Representative Cases Illustrating the Influence of Different Parameters on the Maximum Capacity of an Optical Switch Having a Parallel Architecture

| | | Case 4 | Case 5 | Case 6 | Case 7 |
|---|---|---|---|---|---|
| 1 | Number of AWGs | 1 | 2 | 4 | 16 |
| 2 | Bit Rate, r (Gb/s) | 40 | 20 | 10 | 2.5 |
| 3 | Throughput per Transmitter Card, (Gb/s) | 40 | 40 | 40 | 40 |
| 4 | Spectral Efficiency, $\eta$ | 0.4 | 0.4 | 0.4 | 0.4 |
| 5 | Tuning Range, $\Delta\Lambda$ (nm) | 32 | 32 | 32 | 32 |
| 6 | Channel Spacing, $\Delta\lambda$ (nm) | 0.8 | 0.4 | 0.2 | 0.05 |
| 7 | Maximum Number of Channels per Laser, $N_{laser}$ | 40 | 80 | 160 | 640 |
| 8 | Maximum Number of Ports per AWG, $N_{AWG}$ | 100 | 128 | 120 | 120 |
| 9 | Maximum Number of Transmitter Cards | 40 | 80 | 120 | 120 |
| 10 | Switch Capacity (Gb/s) | 1600 | 3200 | 4800 | 4800 |

Similar to Table 1, in each particular case presented in Table 2, the maximum number of channels in a switch (which corresponds to the maximum number of transmitter cards in a switch) is limited by the smaller entry on lines 7 and 8 (underlined and in bold in the table and also shown in line 9). For example, in cases 4 and 5, the maximum number of channels per laser is limiting. On the other hand, in cases 6 and 7, the maximum number of ports is limiting. The maximum switch capacity (line 10) is then obtained by multiplying the maximum number of transmitter cards in the switch (line 9) by the throughput per transmitter card (line 3).

The results of Table 2 indicate that parallelization of switch fabrics according to the present invention can be used to increase overall switch capacity. For example, for a given throughput per transmitter card (line 3), spectral efficiency (line 4), and tuning range (line 5), using two parallelized AWGs (Case 5) instead of a single AWG (Case 4) can double the switch capacity. Table 2 also indicates, however, that there is a limit to how much switch capacity can be increased simply by adding additional parallelized AWGs. For example, doubling the number of AWGs (line 1) from Case 5 to Case 6 results in only a 50% increase in switch capacity, while quadrupling the number of AWGs from Case 6 to Case 7 results in no increase in switch capacity.

The results of Table 2 also indicate that increasing the bit rate might not be beneficial for the switch capacity in the parallel architecture. For example, comparing Cases 5 and 6 in Table 2 reveals that the higher bit rate (20 Gb/s, Case 5) results in lower switch capacity. However, lowering the bit rate in the parallel architecture might not be beneficial either. More specifically, a relatively low bit rate would carry cost, space, and power penalties as it forces the use of more AWGs per switch. Therefore, an optimal bit rate may be selected for implementing a parallelized switch. An upper limit for such optimal bit rate ($r_0$) may be estimated using Equation (3) as follows:

$$r_0 = \eta c \frac{\Delta\lambda_0}{\lambda_c^2} \tag{3}$$

where c is the speed of light, $\Delta\lambda_0$ is the channel spacing in the AWGs, and $\lambda_c$ is the center wavelength corresponding to the tuning range of the lasers in the switch (e.g., lasers 310 in switch 208). Using Equation (3) and $\lambda_c$ of about 1550 nm, one can estimate $r_0$ to be about 13.3 Gb/s. Therefore, Case 6 in Table 2 may represent one optimal choice of parameters for implementing a parallelized optical switch of the present invention.

The results of Table 2 further indicate that, in the cases where the switch capacity is limited by the maximum number of ports per AWG (i.e., $N_{laser} > N_{AWG}$), the channel spacing in the AWGs ($\Delta\lambda_0$) can be configured based on Equation (4) as follows:

$$\Delta\lambda_0 = \frac{\Delta\Lambda}{N_{AWG}} \quad (4)$$

For example, in Case 6, channel spacing of about 0.27 nm may be used instead of 0.2 nm without decreasing the switch capacity. Greater channel spacing helps, for example, to reduce inter-channel crosstalk.

Figure 4:
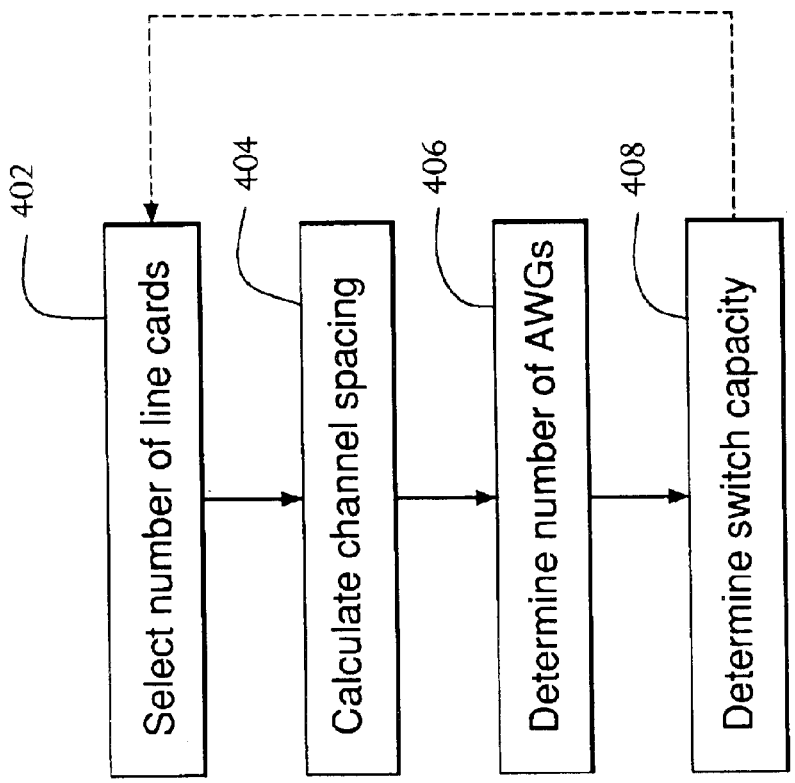
FIG. 4 illustrates a method for optimizing switch capacity according to one embodiment of the present invention.

FIG. 4 illustrates a method 400 for optimizing switch capacity according to one embodiment of the present invention. In step 402 of method 400, a number of transmitter cards in the switch (e.g., transmitter cards 306 in switch 208) is selected based on the maximum number of channels per laser and the maximum number of ports per AWG. The maximum number of channels per laser may be determined, e.g., using Equation (1). The maximum number of ports per AWG may be determined, e.g., as described above, using the wafer size and a preferred channel spacing. Then, the number of transmitter cards in the switch may be selected, e.g., as the lower one of the maximum number of channels per laser and the maximum number of ports per AWG.

In step 404 of method 400, channel spacing of the AWGs in a switch is calculated based on the tuning range of lasers (e.g., lasers 310) and the number transmitter cards selected in step 402. Step 404 may be implemented, e.g., using Equation (4). In step 406 of method 400, the number of AWGs in the switch (e.g., AWGs 304 in switch 208) is determined based on the bit rate employed in the system (e.g., system 200 of FIG. 2), spectral efficiency, and the throughput per transmitter card. In step 408 of method 400, switch capacity is calculated using the number of transmitter cards selected in step 402 and the bit rate. If necessary, steps 402–408 are repeated until switch parameters are optimized for a desired set of criteria. Such criteria may include but are not limited to switch capacity, cost, and/or size.

While this invention has been described with reference to illustrative embodiments, this description is not intended to be construed in a limiting sense. Various modifications of the described embodiments, as well as other embodiments of the invention, which are apparent to persons skilled in the art to which the invention pertains are deemed to lie within the principle and scope of the invention as expressed in the following claims.

Although the steps in the following method claims, if any, are recited in a particular sequence with corresponding labeling, unless the claim recitations otherwise imply a particular sequence for implementing some or all of those steps, those steps are not necessarily intended to be limited to being implemented in that particular sequence.

What is claimed is:

1. An apparatus, comprising:
   (A) J optical switch fabrics (OSF), each OSF having N input ports and N output ports and configured to route optical signals from the input ports to the output ports based on wavelength, where J and N are integers greater than one;
   (B) N transmitter cards, each transmitter card comprising a tunable laser and J modulators, each modulator configured to modulate a signal generated by said tunable laser with data, wherein the J modulators are coupled to J corresponding input ports of the J OSFs; and
   (C) N receiver cards, each receiver card comprising J receivers coupled to J corresponding output ports of the J OSFs, wherein the apparatus is configured to route data from any transmitter card to any receiver card.

2. The apparatus of claim 1, wherein each OSF is an arrayed waveguide grating.

3. The apparatus of claim 1, wherein data signals applied to the J modulators of at least one transmitter card are based on an input trunk signal.

4. The apparatus of claim 3, further comprising, for each input trunk signal:
   a demultiplexer configured to convert the input trunk signal into J branch signals, wherein the corresponding receiver card receives J tributary signals corresponding to the J branch signals; and
   a multiplexer configured to convert the J tributary signals into an output trunk signal.

5. The apparatus of claim 4, further comprising:
   for each branch signal, an input buffer configured to process the branch signal to generate the data signal applied to the corresponding modulator; and
   for each tributary signal, an output buffer configured to process the corresponding tributary signal to generate a signal applied to the multiplexer.

6. The apparatus of claim 1, wherein data transmission capacity of the apparatus is optimized based on at least one of the number of channels per laser, tuning range of the tunable lasers, bit rate, spectral efficiency, and throughput per transmitter card.

7. The apparatus of claim 6, wherein:
   the capacity of the apparatus is limited by a maximum number of ports per OSF rather than by a maximum number of channels per tunable laser; and
   the maximum number of channels per tunable laser is selected to provide channel spacing that limits inter-channel crosstalk.

8. The apparatus of claim 6, wherein:
   the capacity of the apparatus is limited by a maximum number of channels per tunable laser rather than by a maximum number of ports per OSF; and
   the maximum number of ports per OSF is selected to provide channel spacing that limits inter-channel crosstalk.

9. The apparatus of claim 1, wherein values for N and J have been selected to maximize data transmission capacity of the apparatus.

10. The apparatus of claim 9, wherein N and J have been selected by:
    (I) selecting an estimate for N based on a number of channels per laser and a size of the OSFs;
    (II) selecting an estimate for J based on a tuning range of the tunable lasers, a bit rate employed in the apparatus, spectral efficiency, data throughput per transmitter card, and the estimate for N selected in step (I); and
    (III) repeating steps (I) and (II) one or more times selecting different estimates for N and J to maximize the data transmission capacity.

11. A method of transmitting data, comprising the steps of:
    (i) modulating an optical signal generated by a tunable laser with data using J modulators to produce J data-modulated optical signals, where J is an integer greater than one; and (ii) routing the J data-modulated optical signals using J optical switch fabrics (OSF), wherein:

each OSF has N input ports and N output ports and is configured to route optical signals from the input ports to the output ports based on wavelength, where N is an integer greater than one; and the J modulators are coupled to J corresponding input ports of the J OSFs.

12. The method of claim 11, wherein each OSF is an arrayed waveguide grating.

13. The method of claim 11, wherein step (i) comprises the step of generating data signals applied to the J modulators based on an input trunk signal.

14. The method of claim 13, wherein step (i) further comprises the step of converting the input trunk signal into J branch signals.

15. The method of claim 14, wherein step (i) further comprises the step of processing the J branch signals to generate the data signals applied to the J modulators.

16. The method of claim 11, further comprising the step of:

(iii) receiving the J data-modulated optical signals using J receivers coupled to J corresponding output ports of the J OSFs.

17. The method of claim 16, wherein step (iii) comprises the step of combining tributary signals generated based on outputs of the J receivers into an output trunk signal.

18. The method of claim 17, wherein step (iii) further comprises the step of processing outputs of the J receivers to generate the tributary signals.

19. The method of claim 11, wherein data transmission capacity is optimized based on at least one of the number of channels per laser, tuning range of the tunable lasers, bit rate, spectral efficiency, and throughput per transmitter card.

20. The method of claim 19, wherein:

the data transmission capacity is limited by a maximum number of ports per OSF rather than by a maximum number of channels per tunable laser; and the maximum number of channels per tunable laser is selected to provide channel spacing that limits inter-channel crosstalk.

21. The method of claim 19, wherein:

the data transmission capacity is limited by a maximum number of channels per tunable laser rather than by a maximum number of ports per OSF; and the maximum number of ports per OSF is selected to provide channel spacing that limits inter-channel crosstalk.

22. The method of claim 9, wherein values for N and J have been selected to maximize throughput of the data.

23. The method of claim 22, wherein N and J have been selected by:

(I) selecting an estimate for N based on a number of channels per laser and a size of the OSFs;

(II) selecting an estimate for J based on a tuning range of the tunable lasers, a transmission bit rate, spectral efficiency, data throughput per J modulators, and the estimate for N selected in step (I); and (III) repeating steps (I) and (II) one or more times selecting different estimates for N and J to maximize the throughput of the data.

24. A method of designing an apparatus comprising:

(A) J optical switch fabrics (OSFs), each OSF having N input ports and N output ports and configured to route optical signals from the input ports to the output ports based on wavelength, where J and N are integers greater than one;

(B) N transmitter cards, each transmitter card comprising a tunable laser and J modulators, each modulator configured to modulate a signal generated by said tunable laser with data, wherein the J modulators are coupled to J corresponding input ports of the J OSFs; and (C) N receiver cards, each receiver card comprising J receivers coupled to J corresponding output ports of the J OSFs, wherein the apparatus is configured to route data from any transmitter card to any receiver card;

the method comprising:

(I) selecting an estimate for N based on a number of channels per laser and a size of the OSFs;

(II) selecting an estimate for J based on a tuning range of the tunable lasers, a transmission bit rate, spectral efficiency, data throughput per J modulators, and the estimate for N selected in step (I); and (III) repeating steps (I) and (II) one or more times selecting different estimates for N and J to maximize data transmission capacity of the apparatus.

25. The method of claim 24, wherein:

the data transmission capacity is limited by the size of the OSFs rather than by the number of channels per tunable laser; and the number of channels per tunable laser is selected to provide channel spacing that limits inter-channel crosstalk.

26. The method of claim 22, wherein:

the data transmission capacity is limited by the number of channels per tunable laser rather than the size of the OSFs; and the size of the OSFs is selected to provide channel spacing that limits inter-channel crosstalk.

* * * * *